United States Patent
Van Sprang et al.

(10) Patent No.: US 12,030,149 B2
(45) Date of Patent: Jul. 9, 2024

(54) MACHINE-TOOL UNIT HAVING A TOOL SENSOR FOR SENSING A CUTTING-EDGE LOAD ON A TOOL

(71) Applicant: FRANZ KESSLER GMBH, Bad Buchau (DE)

(72) Inventors: Joachim Van Sprang, Ravensburg (DE); Harald Weing, Biberach (DE); Daniel Weiß, Herbertingen (DE)

(73) Assignee: Franz Kessler GmbH, Bad Buchau (DE)

( * ) Notice: Subject to any disclaimer, the term of this patent is extended or adjusted under 35 U.S.C. 154(b) by 477 days.

(21) Appl. No.: 17/303,545

(22) Filed: Jun. 2, 2021

(65) Prior Publication Data

US 2021/0379718 A1 Dec. 9, 2021

(30) Foreign Application Priority Data

Jun. 9, 2020 (EP) ..................................... 20179114

(51) Int. Cl.
- *B23Q 17/09* (2006.01)
- *G01L 5/00* (2006.01)
- *G05B 19/4065* (2006.01)
- *B23B 49/00* (2006.01)

(52) U.S. Cl.
CPC ........ *B23Q 17/0966* (2013.01); *G01L 5/0076* (2013.01); *G05B 19/4065* (2013.01); *B23B 49/00* (2013.01); *G05B 2219/37355* (2013.01)

(58) Field of Classification Search
CPC .. B23Q 17/0966; B23Q 1/70; B23Q 17/0952; B23Q 17/0957; G01L 5/0076; G05B 19/4065; G05B 2219/37355; G05B 2219/37225; B23B 49/00; Y02P 90/02
See application file for complete search history.

(56) References Cited

U.S. PATENT DOCUMENTS

| | | |
|---|---|---|
| 6,301,520 B1 | 10/2001 | Hayashi |
| 2015/0261207 A1 | 9/2015 | Wunderlich et al. |
| 2019/0112924 A1* | 4/2019 | Kawai ..................... E21D 9/003 |
| 2019/0258222 A1* | 8/2019 | Karandikar ........ G05B 19/4065 |
| 2020/0001419 A1 | 1/2020 | Ruf et al. |
| 2022/0009049 A1* | 1/2022 | Liu ..................... G05B 19/4065 |

FOREIGN PATENT DOCUMENTS

| | | |
|---|---|---|
| EP | 593 456 A1 | 11/2005 |
| EP | 924 526 A1 | 9/2015 |
| EP | 360 642 A1 | 8/2018 |
| WO | 2019/101617 A1 | 5/2019 |

OTHER PUBLICATIONS

Extended European Search Report (Application No. 20 179 114.2) dated Nov. 23, 2020.

* cited by examiner

*Primary Examiner* — Phuong H Nguyen
(74) *Attorney, Agent, or Firm* — BURR PATENT LAW, PLLC

(57) ABSTRACT

A method for sensing a cutting-edge load in a motor-driven machine-tool unit having a stator unit and a rotor unit that is rotatable at least about an axis of rotation. The rotor unit includes a tool receiving unit that is adjustable along the axis of rotation and to which a clamping force can be applied, for fixing and clamping a releasably fixable tool shank of a tool. A tool head of the tool includes at least one individual cutting edge. A tool sensor is provided for sensing the load on the tool, the tool sensor being realized as an individual-cutting-edge sensor for sensing a cutting-edge load on the individual cutting edge.

19 Claims, 7 Drawing Sheets

MACHINE-TOOL UNIT HAVING A TOOL SENSOR FOR SENSING A CUTTING-EDGE LOAD ON A TOOL

This application claims the benefit under 35 USC § 119(a)-(d) of European Application No. 20 179 114.2 filed Jun. 9, 2020, the entirety of which is incorporated herein by reference.

FIELD OF THE INVENTION

The present invention relates to a motor-driven machine-tool unit, such as a multi-axis rotary head or a motor spindle, and a method for sensing a cutting-edge load.

BACKGROUND OF THE INVENTION

In the case of machine tools, there are various interchangeable devices, or tools, that are connected to the machine tool via standardized interfaces. In this case, these are tools that are connected to the machine-tool spindle, or motor spindle, via a disconnectable taper connection and for which so-called collet chucks are opened or closed by an axial movement, such that the axial force required to securely fasten the tool can be transmitted to the tool or can also be released again later.

The tools used for machining can only be used until they reach a typical wear limit, which is usually specified by the manufacturer. If the tools used are excessively worn and abraded beyond the wear limit, the machining results usually no longer meet the requirements. In order to avoid producing a high level of rejects in the manufacturing processes until it is determined on the basis of a quality control of the workpieces received that, for example, manufacturing tolerances or dimensional accuracy or edge sharpness or the like can no longer be maintained due to a worn tool, it is sought to be able to check and track the tool state in situ, i.e. during the machining process.

According to EP 2 924 526 A1 and WO 2019/101 617 A1, this is done by means of a measuring device, additional to the machine tool, of tool-holder adapters equipped with corresponding measuring sensors, on which tool-loading bending moments are sensed according to their components oriented in two linearly independent directions perpendicular to the axis of rotation and stationary relative to the rotating tool, and considered as value pairs of the components thus sensed in a corresponding coordinate system. In the case of this known proposal, an image obtained in this way is considered, in particular, with regard to sensed symmetries and disturbances thereof, with disturbances of the symmetries being sensed as deviations from a specified state and being sensed as wear of at least one cutting edge of a multi-edged tool. This system is already offered under the brand name "SPIKE" by the company pro-micron GmbH & Co. KG.

The specifically indicated representation of value pairs of bending moment components sensed by means of strain gauges is effected in two linearly independent directions, which are perpendicular to the axis of rotation of the tool. The purpose of this is to identify the state of the tool and problems with the tool for each individual cutting edge of the tool, and to indicate this by means of a wear characteristic value.

Depending on the wear on the individual cutting edge, the worn tool should then be replaced at an early stage, for example, in order to avoid, in particular, breakage of the cutting edges/cutting lips, or inaccuracies in machining and/or rejection of the workpiece/product as far as possible.

The main disadvantage of this previous system, however, is the great constructional and economic effort involved, inter alia with the additional, separate adapter and the additional evaluation device, or computer. The measuring electronics, or sensors, in this case are integrated into each individual tool holder of the machine tool, which increases costs and effort. Thus, the spontaneous use of another tool holder is also only possible to a limited extent if there is a corresponding need.

In the case of this system, the sensor data/signals are transmitted wirelessly from the tool adapter to the evaluation device, or computer. This is not only complex, but also susceptible to interference, especially under the "rough" conditions of industrial chip machining and the countless sources of interference usually present in a corresponding production hall.

In addition, the effective length between an action of force (machining force) and a so-called HSK (hollow shank taper) plane surface is increased with this system, or by the adapter. This results in considerably greater bearing loads due to the correspondingly increased lever ratios of this system, which is also disadvantageous.

In addition, a "SPIKE inspindle" variant is now also available. This uses a special tapered sleeve that is basically placed in front of the shaft. Although this variant is not tool-dependent, the technical and economic disadvantages mentioned above largely remain.

Irrespective of this, in the case of so-called "deep hole drilling", very early and exact identification of potentially dangerous wear, or change, on the individual cutting edge is of decisive importance in order to avoid breaking and jamming of part of the drill bit in the workpiece. This could possibly be further improved.

SUMMARY OF THE INVENTION

The object of the present invention is to propose a motor-driven machine-tool unit and/or a method for sensing a cutting-edge load, with the constructive and economic effort being reduced as far as possible compared to the prior art and/or higher requirements being met, in particular, with regard to the accuracy of the machining and/or the safety during machining and/or the early identification of detrimental wear of a single cutting edge.

Accordingly, a machine-tool unit according to the present invention is characterized in that the stator unit comprises at least the individual-cutting-edge sensor.

As a result of the single cutting edge sensor being arranged on/in the stator unit according to the present invention, it is possible to dispense with an additional separate tool adapter and an additional evaluation device provided with a display unit/screen. In addition, it is not necessary to divide the rotor shaft in order to integrate the single-cutting-edge sensor, as is the case with some of the prior art. Thus, in particular, the constructive and economic effort is significantly reduced compared to the prior art.

Within the meaning of the present invention, the individual-cutting-edge sensor makes it possible to sense a cutting-edge load on the individual cutting edge, even or especially in cases where the tool has not just one cutting edge, but a plurality of cutting edges on the tool head. Currently, for example, commercially available drill bits often comprise two individual cutting edges, and in many cases commercially available milling cutters comprise four individual cutting edges, or even more than four individual cutting edges. Within the present invention, both cutting lips and so-called cutting inserts, or so-called tool tips, may be understood as a cutting edge, or cutting edges. In the case of commercially available tools, cutting inserts, or tool tips, are often composed of hard metal, cermet, polycrystalline cubic boron nitride (CBN), polycrystalline diamond (PCD) or cutting ceramics or, more rarely, of HSS, HSSE/HSS-PM, and serve as cutting material carriers for machining metals, plastics or wood, for example.

Consequently, according to the present invention, a change such as wear, or abrasion, and/or a partial breakage/breakage and/or jamming/wedging of the individual cutting edge and/or of a plurality of cutting edges may advantageously be sensed and analyzed/evaluated. If necessary, an advantageous machine reaction such as, for example, the output of an alarm or signal and/or display, and/or slowing down and/or stopping of the machining, or operation, may also be effected, in particular, by means of an advantageous electrical/electronic monitoring unit.

According to the present invention, the effective length between an application of force/cutting edge (machining force) and a so-called HSK plane surface is also not "extended". Compared to the prior art mentioned above, therefore, this results in a considerably lesser bearing load, due to the significantly shortened lever ratios relative to the previously known system. This has a positive effect on the dimensioning/loading of the bearings.

In addition, according to the present invention, the operation/process in general is positively influenced, especially by the shorter extension length of the tool. The tool has a greater rigidity, with the result that the deflection of the tool during operation/a process is less than in the prior art. The chatter effect is also positively influenced. Due to the shorter tool length, the tool only starts to vibrate/chatter at higher loads, which improves the accuracy of the machining.

Basically, due to the absence, according to the present invention, of additional tool adapters, the hitherto commercially available tools and tool holders etc. can be used without conversion or modification. Also, bearings of the machine units according to the present invention, such as motor spindles or the like, which have been customary or used up to now, need not/cannot be changed, which also reduces costs and effort.

Thus, the sensor system according to the present invention can advantageously be integrated in the machine-tool unit, or motor spindle. Integration of the measuring electronics into each tool holder/adapter, or into a plurality of tool holders/adapters, and/or into each tool to be monitored for the machine-tool unit is thus not necessary. Also, advantageously, the sensor system, or the individual-cutting-edge sensor and/or the electronics are only required/mounted, or fitted, once per machine unit, or per motor spindle. Accordingly, the costs and expenses are low according to the present invention.

Preferably, a machine monitoring unit and/or machine display unit comprises the processing or evaluation/representation, or a sensor evaluation unit, or sensor display unit, for evaluating and/or preparing and/or displaying/representing the (advantageously prepared) sensor signals/sensor data. Accordingly, the constructive and economic effort is also significantly reduced compared to the prior art. Integration of the processing of the sensor signals/data into the machine control system, or machine monitoring unit, which is always present nowadays, can also enable better, in particular, faster data processing, since there is no "diversion" via a separate evaluation device, i.e. usually also from another manufacturer, but instead there is direct processing in/by means of the control system, or electrical/electronic monitoring system, of the machine. This is of great advantage, inter alia in the case of very short reaction times such as, for example, before a (sensor-detected) pending breakage of the cutting edge or in the case of sudden, unforeseen jamming of a chip on one of the cutting edges of the tool.

Advantageously, the individual-cutting-edge sensor is realized as an individual-cutting-edge force sensor for sensing a force applied to the individual cutting edge. It has been shown in innumerable tests that the sensing of the force acting on the individual cutting edge, or loading/applied to the individual cutting edge, is substantially more direct and advantageous than the sensing of a bending moment on/at the tool, or tool holder. Especially the axial loads, or applied force, such as those that occur/are present in the case of very many, frequently used tools, i.e. drill bits, end mills, etc., can be sensed and evaluated much better/more accurately than can be realized in comparison with sensed bending moments. Bending moments of the tool, or tool holder, usually result substantially from radial loads, or action of forces, which, however, are only indirectly present in the case of drilling.

The advantageous measurement of force according to the present invention makes it possible to achieve particularly exact results, i.e. it is thereby possible to realize particularly good sensing of the load, or force, applied to the individual cutting edge, which can be further used or processed, for example, by means of an advantageous electronic monitoring unit.

In an advantageous variant of the invention, the individual-cutting-edge sensor is arranged at least partially at the level of the tool clamping device and/or the tool holding unit, as viewed in the axial direction. Accordingly, as viewed in the direction of the axis of rotation, the individual-cutting-edge sensor is arranged next to, or at the level of, or in the region of the tool clamping device/collet chuck/clamping segments and/or tool receiving unit and, as viewed, in particular, in the radial direction, outside of, or at, a greater radius than the tool clamping device/collet chuck/clamping segments and/or tool receiving unit. This allows the displacements and/or material deformations of the counter-bearing/stop, or of the spindle shaft, or the tool receiving unit/tool clamping device, caused by the application of load/force to the individual cutting edge/edges, to be sensed in an advantageous manner.

In a particular further development of the present invention, the individual-cutting-edge sensor is realized as a displacement sensor and/or deformation sensor for sensing a displacement and/or deformation of at least a part of the rotor unit and/or of the tool receiving unit caused by the cutting-edge load on the individual cutting edge. For example, (very small) displacement of the shaft and/or material deformations, in particular, a few micrometers, generated by the load on the individual cutting edge can advantageously be used/sensed, or evaluated, and preferably control/monitoring of the machining, in particular, during operation or chip machining, can be realized. This means that, advantageously, the application of force and/or the wear and/or vibrations in the axial direction along the axis of rotation, or over the axial path, are assessed/realized. It is thus possible to realize entirely new possibilities for monitoring the machining process of each individual cutting edge and thereby achieve a significantly greater accuracy and safety of the machining.

Preferably, the individual-cutting-edge sensor is realized as a contactlessly operating sensor for contactless sensing of the cutting-edge load on the individual cutting edge and/or displacement of the shaft caused by the force on the cutting edge, or cutting edges. It is thus possible to dispense with a transmission unit for transmitting the sensor signal, or the measurement data, from the rotating rotor unit, or a rotating adapter or the like that is fixedly connected to the tool, to a static evaluation unit and/or to the static stator unit. This additionally reduces the constructional and economic effort, compared to the prior art mentioned above. Also, abrasion or wear of corresponding (contacting or rubbing) elements of the sensor system is effectively prevented and a long service life is made possible.

Consequently, according to the present invention, the relaying of the data/signals, or information, can advantageously be realized (entirely) by cable, or by means of (electrical) cables/lines and, in particular, in the front portion of the machine-tool unit, or the motor spindle, from the sensing, or "information procurement". Relaying, or transmission, by cable/line is substantially less susceptible to disturbances or distortions, or errors, in the transmission of the sensitive data/signals, or their least/smallest changes, from the individual cutting edges of the tool during machining at sometimes very high rotational speeds, and thus at very short time intervals, etc.

Advantageously, the individual-cutting-edge sensor is realized as a proximity sensor for sensing a distance between the stator unit/proximity sensor and at least a part of the rotor unit and/or of the tool receiving unit, this distance being such that it can be altered by the cutting-edge load on the individual cutting edge. In this case, advantageously, the distance, and thus a change in distance between a movably mounted component/shaft of the rotor unit and the stator, or stator component/housing, can be sensed/measured, and thus the action of force can be detected, especially from each individual cutting edge. In this way, high-frequency (smallest) changes in force can be detected more precisely, inter alia because various ambient vibrations can be filtered out by means of an advantageous measuring arrangement, e.g. relative measurement. A measuring point on the fixed bearing, i.e. usually on the front side of the motor spindle, is very suitable.

Accordingly, the displacement and/or material deformation, in particular, of the rotor component, caused by the tool machining or chip/machining can be sensed in an advantageous manner, as this changes, i.e. reduces or increases, an air gap, or distance, between the rotor unit and the stator unit. According to the present invention, this change in distance can be used to indirectly sense an individual cutting edge of the tool, or its change and/or state, such as, for example, wear/abrasion/part breakage, jamming/wedging of a chip or the like.

In advantageous embodiments of the present invention, the individual-cutting-edge sensor is realized as an inductive sensor, in particular, an eddy-current sensor, and/or an optical and/or magnetic sensor/Hall sensor and/or as an ultrasonic sensor and/or radar sensor. Corresponding sensors may be acquired as already commercially available and proven sensors, and used, or applied, according to the present invention. This improves the cost-effectiveness and reliability of the sensing.

Specifically, realization of the individual-cutting-edge sensor as a contactless and/or non-contact sensor ensures particularly advantageous sensing of the displacement and/or deformation, and generation and, if necessary, relaying of advantageous sensor signals or measurement data. In this case, advantageously, a distance/air gap to be sensed between the rotor unit and the stator unit will change/decrease. Particularly advantageous for this purpose are inductive sensors having at least one measuring coil, magnetic sensors having a magnetic, or magnetizable, material/element, and/or optical sensors having a light wave transmitter and/or receiver and/or reflector, e.g. the deforming portion/surface of the rotor unit/tool clamping device/spindle shaft. For example, visible light, laser light, UV or infrared light and/or an optical interferometer or the like may be used to sense, for example, the change in distance.

Preferably, the individual-cutting-edge sensor is realized as an axial sensor having at least one sensing region aligned in the longitudinal direction of the axis of rotation. It has been shown that axial loads on, for forces applied to, the tool cutting edge, or cutting edges, generate a (slight) axial displacement and/or deformation of the counter-bearing/stop, or of the rotor/spindle shaft. The axially aligned compression of the counter-bearing/stop, or the rotor shaft or spindle shaft, and/or its components, that is generated by the machining can be sensed by means of the advantageous axial sensor. Depending on the arrangement/design of the axial sensor, a distance/air gap to be sensed may either increase or decrease.

In an advantageous variant, the individual-cutting-edge sensor is realized as a radial sensor having at least one sensing region aligned perpendicularly in relation to the longitudinal direction of the axis of rotation. In this way, advantageously, the displacement and/or radial deformation of the counter-bearing/stop of a component of the rotor unit and/or the spindle shaft generated by the machining can be sensed by means of the advantageous radial sensor.

In general, with use of the individual-cutting-edge sensor according to the present invention, the use of only a single sensor can already be advantageous in the case of impairment and/or breakage and/or fouling, detrimental alteration, of the individual cutting edge, or plurality of cutting edges. Thus, for example, in the case of a breakage of one of the (four/six) cutting edges during machining, i.e. in rotating operation, or with the rotor unit/spindle shaft/motor spindle rotating, according to the present invention this one sensor can already sense the change/impairment of one/each individual cutting edge. This is because the by the change/reduction, or the absence, of the displacement and/or deformation according to the present invention at the location of the previous and/or normal/normalized detection/regions makes this detectable, at the latest, upon/after a complete revolution of the shaft/rotor unit.

Also, for example, fouling of just one of the preferably plurality of cutting edges can be sensed even at the beginning of the machining, or chip machining, of the tool by means of a single individual-cutting-edge sensor according to the present invention. This is because, during start-up/starting, or at the latest after a complete revolution of the rotor unit/spindle shaft, for example, a chip, or dirt particle, that is or has been, wedged between an individual cutting edge and the workpiece can result in a detectable change in the displacement and/or deformation, in particular, in a greater, or more pronounced, spatial displacement and/or material deformation at this particular location on the rotor unit. According to the present invention, this can be sensed and processed/used further, e.g. for monitoring, or controlling, and/or braking/stopping the rotor unit, or the spindle shaft/motor spindle.

In general, advantageous signaling of a sensed change in the displacement and/or deformation, i.e. in particular, a deviation of the sensed actual position and/or actual deformation from the (expected) specified position and/or specified deformation, is helpful for the operator of the machine tool. Preferably, a signaling column and/or a display/screen indication are/is activated, such that the operator is notified of the change, or impairment, and looks for the error, or change, and eliminates it. This achieves a significant improvement in quality assurance, or the avoidance of rejects.

By means of an advantageous rotary encoder or the like, for example, the individual cutting edge/cutting segment can be determined and, if necessary, displayed/identified.

Alternatively or in combination, a (graphical) representation/presentation may be realized for this in a coordinate system, in particular, a Cartesian or polar coordinate system. If necessary, the correspondingly used tool, or cutting edge/cutting edges, is/are displayed virtually on an indicator, or screen/display, and in this case, advantageously, the cutting edge/location, or position, of the sensed/ascertained change/impairment, such as wear/abrasion and/or breakage, or risk of breakage, of a cutting edge or part of a cutting edge and/or jammed chip on a cutting edge etc. is/are displayed.

Preferably (immediately or directly) after/upon/during the sensing of a change in the deformation and/or a deviation of the sensed actual position and/or actual deformation from a (stored/defined) specified position and/or specified deformation, a stopping-down/braking, or stopping, of the rotor unit can be generated by means of an electrical monitoring, or control, unit, in particular, even before a tool breakage or the like, such that no inaccuracy, or detriments, can arise during the machining of the workpiece, in particular, in respect of accuracy.

Advantageously, at least two or more individual-cutting-edge sensors are arranged in the circumferential direction, in particular, at mutually different angular positions around the axis of rotation and/or symmetrically around the axis of rotation. In this way, the change in, for example, the above-mentioned displacements and/or deformations, and also an oscillation of the rotating rotor unit, in particular, of the spindle shaft, or motor spindle, can be sensed in an advantageous manner. Preferably (immediately, or directly) after/upon/during the sensing of a change in the distance, or in the oscillations, of the rotating rotor unit, in particular, of the spindle shaft, or motor spindle, and/or a deviation of the sensed actual oscillations from (stored/defined) specified oscillations, a stopping-down/braking, or stopping, of the rotor unit can be generated by means of an electrical monitoring, or control, unit, such that no inaccuracy, or detriments, can arise during the machining of the workpiece, in particular, in respect of accuracy.

The present invention advantageously relates to the sensing of the elastic displacements and/or deformations of the components of a machining spindle, or motor spindle, in the power flow that are caused by the application of force, or load, to an individual cutting edge of the tool. It is advantageous in this case that the displacements and/or deformations caused by the cutting force can be measured in the course of/during operation, and inference can thus be drawn concerning the safe and precise machining of the workpiece in respect of each individual cutting edge.

In principle, reference measurements may be performed at any time. It may also be useful to perform measurements at regular intervals and, if necessary, to use more recent data sets as reference measurements. A reference measurement in the new, or cleaned, state helps to maintain, or store, the actual state without great effort, or without abrasion or cutting-edge changes, in particular, in a database or storage medium. However, a new recording of reference measurements may be used to check whether the distance values generally change due to regular operation, abrasion or the like.

Contrary to a technical preconception, it is not absolutely necessary to use two sensors that measure a state, for example, at different angular positions in a plane perpendicular to the axis of rotation, in order to determine deflections at different angular positions and to be able to use the data for evaluation. Rather, a measurement at a single angular position, e.g. by means of a single sensor, is sufficient, the comparison with a specified value being advantageously taken into account.

Preferably, the rotor unit and/or the tool receiving unit comprise/comprises at least one marking and/or a measuring element, in particular, a measuring ring. For example, the rotor unit may have an additional element specially for measuring, or sensing, with respect to which measuring is performed, or relative to which the sensor, or its sensor head, measures the distance.

Depending on the type of sensor/head, the measuring ring may thus have the properties advantageous for measuring, e.g. be made of an appropriate material or have measurement markings. Due to the size of the measuring ring, the effect can also be increased, similar to a lever, i.e. a small deformation has a greater effect over a greater distance, such that a higher measuring sensitivity and measuring accuracy can be achieve. In the case of inductive sensors, in particular, eddy-current sensors, it may be advantageous if the material used for the measuring ring, although being electrically conductive, nevertheless has no ferromagnetic properties, but only the induction of a voltage has to be taken into account. The measuring ring may be made, for example, of aluminum, which is light and forms a passivating oxide layer on the surface, i.e. is also corrosion-resistant.

In the case of an exemplary embodiment of the present invention, the marking and/or the measuring ring may be placed, for example, on the spindle head. It is also conceivable for the spindle head and measuring ring, or marking, to be realized in one piece, i.e. to be fixedly connected to each other or to be made of one material. The latter embodiment is suitable for manufacturing reasons, for example, if the spindle head and measuring ring, or marking, can be made of the same material. Furthermore, a measuring ring offers the advantage that reference markings can also be applied in almost any way without impairing the functionality of the rotor unit, enabling the quality of measurement to be improved.

If a sequence of measurement values is recorded and compared, for example, with another sequence of measurement values, the phase relationship between the two sequences, or series of measurement values, is advantageously known. At least the assignment of the measurement values to be compared should be effected in such a manner that there is a constant phase relationship, so that the evaluation can provide meaningful results. It is normally advantageous if, between two successive measurement values in the respective sequence, there was always a constant time interval between the measurements, and/or the rotor unit has rotated through the same angle, such that the angular differences between the positions at which measurements were taken can be tracked on the basis of the measurement. Advantageously, in the case of a further development of the present invention, an initial point may be set in the recording of the sequence of distance values. For this purpose, the measuring ring advantageously has a reference marking, for instance in the form of a groove, bore, other recess or an elevation. In principle, an optical marking is also conceivable.

According to the present invention, the distance values are recorded only by one sensor head. The reference marking can, for instance in the case of a recess or elevation, change the distance in such a way that the checking device recognizes this as the initial point. It is also conceivable, however, to sense the initial point solely by other sensory means, for instance by means of an optical marking. This may be sensed by a separate trigger sensor, which otherwise, however, does not provide a distance value for the evaluation, i.e. does not represent an additional sensor head in the sense of the invention for distance measurement.

An optical marking can offer the advantage that it can be associated with a lesser unbalance on a fast-rotating component. In addition, it is possible to distinguish even more clearly between a deviation due to an axial runout error and the initial point if the reference marking cannot also be interpreted as a deformation, as is the case with a groove or an elevation.

Conceivable in principle for sensing the marking, or the measuring element/ring, are various types of sensor that are possible for the sensor, or sensor head, and by means of with which the distance to the rotor unit and/or to the measuring ring, or marking, can be determined. Preferably, contactless distance sensors may also be used here, since according to the present invention the sensor, or sensor head, is mounted on the stator unit and the distance to a part of the rotor unit is to be determined. Also used here, preferably, is an eddy-current sensor, which, in particular, is generally insensitive to oil, water or non-metallic dust, which must certainly be expected during operation of the machine tool. An eddy-current sensor may be regarded as an inductive sensor. Also conceivable, however, are exemplary embodiments having capacitive or optical sensors for sensing the marking, or measuring ring.

Advantageously, in the case of a further embodiment of the present invention in which an eddy-current sensor is used, the measuring ring may be made of a non-ferromagnetic material, e.g. a paramagnetic material, thereby also enabling the measuring accuracy to be increased, since a ferromagnetic material is always subject to the influence of the magnetic fields prevailing in the machine tool. A ferromagnetic material will, therefore, retain a certain remanence if it has been exposed to a magnetic field, even if there is no longer an external field present. If a magnetization of the measuring ring, or of the part of the rotor unit to which the distance is determined, can influence the measurement, a ferromagnetic material should be avoided and, for example, an eddy-current sensor should be chosen.

For the purpose of evaluation, it is generally advantageous to determine the difference between the current measurement values and the respective reference values in order that the deviations can be identified and evaluated. Since a time sequence of distance values relative to the rotating rotor unit are recorded, the measuring signal can be broken down into a continuous spectrum via a Fourier transformation. As a result, the geometric deviations, i.e. deviating distance values, are represented according to the frequency with which they appear. If greater, especially singularly occurring geometric deviations are seen in the spectrum, it can usually be assumed that there is an axial runout error.

The method according to the present invention for checking, or sensing, an individual cutting edge is characterized by the fact that there is basically no longer any loss of time for the actual measurement, and a measurement can be performed without restriction, for example, also after each tool change or tool-holder change. In this way, it can also be integrated more easily into the machining process, especially since it is not necessary to specifically provide a time period in which only the measuring, or checking, procedure can or must be performed.

Usually, the rotor unit, which rotates relative to the stator unit, is part of a motor-spindle drive. The actual cutting tool (milling cutter, drill bit, etc.) is in turn held, or clamped, in a tool holder, which in turn is arranged in a tool clamping device that is to be regarded as part of the spindle head of the rotor unit. For this purpose, the tool clamping device has a mounting for a tool holder. A clamping force is applied to the tool clamping device and is adjusted in the longitudinal direction of the axis of rotation. A part of the clamping device in this case may be drawn into a tapered receiver, such that the tool holder, or tool, in turn can be clamped inter alia with a radially acting force. Removal of the clamping force causes the clamped tool to released again, and it can be removed from the machine tool, or changed.

Generally, the actual sensor is accommodated in a so-called sensor head; the sensor measures its distance to the rotor unit, the sensor itself being correspondingly arranged in the stator unit. The sensor data are processed, or evaluated, by means of an electronic unit, or evaluation electronics, which may be computer-controlled.

The at least one sensor head is basically arranged on the stator unit, at a fixed position in the region of the tool clamping device, and can measure/sense both on the end face of the rotating spindle head and/or laterally.

In principle, however, sensors, or sensor heads, may also be arranged in variable positions. As a rule, for example, a chip jammed between a tool and a workpiece results in the tool no longer running exactly centrically/straight about the axis of rotation, or in the tool clamping device being slightly (also elastically) deformed, and in an unchanged radial true-running, an unchanged axial true-running of the tool, or tool holder, or running without angular change no longer being assured. As a rule, a disturbance of the radial true-running represents a particular impairment of the machining process. Such misalignments and/or deformations generally occur both laterally and on the end face/axial side, and in principle are also detectable there. On the end face, a distance parallel to the axis of rotation is measured, and laterally a distance radial to the axis of rotation is measured. All such misalignments and/or deformations, up to displacements of the rotor unit, can be ascertained in such a manner.

In principle, a measurement may be effected at an angle of 90° relative to the surface and/or to the axis of rotation of the rotor unit, but also at an angle other than this.

In the case of machine tools, in particular, there are stringent requirements in respect of machining accuracy. In machining, the tool and thus the cutting edge/cutting edges must be inserted and moved in the tool holder, or tool clamping device, in a precisely defined manner so that the workpiece to be machined is machined within the specified tolerance limit. Even if the machine tool, and, in particular, the tool clamping device, are manufactured with the necessary precision, during use of the machine there are additional factors that can prevent the maintenance of a defined radial/axial true-running, or the occurrence of angle errors. During operation of the machine, for example, the chips that occur during machining can adhere to or jam on the tool, with the result that the tool does not rotate in the actual specified position.

Since the wear on the cutting edge and/or the chips are sometimes very small, these errors/deviations from the (normal) specified state are often difficult to ascertain and also occur in a random manner. Nevertheless, such axial runout errors, or angular misalignments, of the tool can result in the workpiece, after having being machined, being outside the tolerance limits.

The sensor/head measures a time-related, or position-related, sequence of distance values. If the sensor/head records a time-related sequence of distance values, this is generally at the same time a position-related sequence, because the rotor unit is rotated in a time-related sequence, unless exactly one full rotation or a plurality of complete rotations have always been effected between the recording of individual measurement values. In general, it is not only changes in axial true-running that can be determined according to the invention, but also, for example, the angular position in radial true-running. It is also conceivable to determine the torsional moment if, for example, a cutting-edge position (phase) changes (in a pronounced manner) in relation to an advantageous marking, for example a reference groove etc., in the course of the machining operation such as milling etc., for example in the case of pocket milling or the like. In this case, the torsion angle could be included as a function of the tool length.

With the aid of the above-mentioned marking on the rotor unit, or at an advantageous location on the rotor shaft, it becomes possible to use a reference marking even if the rotational speed, or angular velocity, is unknown and to clearly detect when exactly one revolution of the rotor unit has been completed. This is advantageous, in particular, when an runout error or angle error is to be determined irrespective of other sensors, without a separate encoder being included in the evaluation. This marking may preferably be detected simultaneously by the sensor/sensor head(s) during the actual measuring process. Thus, in principle, no further sensor is required for this purpose. It is also conceivable, however, for an additional sensor to be provided for separate identification of the marking, in particular, if the distance measurement is to remain independent of identification of the marking.

In the case of a variant of the present invention there is also the option of applying more than one marking, in particular, to the measuring ring. In this way, even more information can be obtained by the measurement, making it possible, for example, to sense the direction of rotation, signal direction or a synchronization. In order for additional information to be obtained with the sensing of the marking, the marking may also have, for example, a particular shape, e.g. an oblique trapezoid, such that for instance the direction of rotation can be recognized from this.

Since the marking may also be used to sense the current rotational speed, or velocity, of the rotor unit, it also has a significant influence on the accuracy of the error measurement according to the method of the present invention. Whereas previously it was necessary to perform this measurement at rotational constant speed to enable the measurement values to be correspondingly compared with and correlated to each other, the present invention aims to save this otherwise required period of time and, for example, to enable a meaningful measurement to be performed during a (positive or negative) acceleration of the rotor unit.

Accordingly, a first, or second, sequence of distance values may usually be recorded outside of the marking region. Since these measurements are effected during an acceleration phase of the rotation of the rotor unit, however, these distance values cannot initially be readily correlated because the time-related sampling is usually effected at a predefined clock rate, i.e. at equal time intervals, but the accelerated rotor unit rotates to different extents between two successive clock pulses and therefore the positions, in particular, in the case of at least two sequences of measurements, no longer match. However, the machining is typically effected at constant rotational speeds/velocities, but may also be effected in an acceleration phase (described earlier).

The path-time relationship, or angle-time relationship, is described as follows:

$$s(t)=0.5\ at^2+v_0 t,$$

wherein s(t) is the time-dependent distance traveled in the time span t, or the angular range swept in the time span t, a is the acceleration, $v_0$ is the current rotational speed/velocity at the time-point under consideration at the start of the time span t.

According to the present invention, sequences of measurement values may be recorded. In this case, the distance of the sensor/head, attached to the stator unit, to the rotor unit is determined, and it is measured whether this distance changes as the rotor unit rotates. To enable the sequences to be compared with each other, or the data to be evaluated (e.g. to enable the sequences to be subtracted), the respective positions must be assignable to the distance values. However, the time is usually measured during the recording of the distance values.

The rotor unit is first accelerated upon the machine being started up. This acceleration may be effected in a substantially uniform manner, i.e. a is substantially constant. In principle, however, especially during starting-up of the rotor unit, there are also non-constant acceleration phases.

At the beginning of the start-up process, however, the acceleration is usually not constant for a certain period of time. The rotational speed as a function of time is slightly curved to the left in this range, so-called S-curve, i.e. the rotor unit starts up a little more slowly, so that the start-up proceeds in a jerk-free manner. This is also referred to as jerk limitation. It is, therefore, advantageous not to measure from standstill, but rather in a range of approximately constant acceleration.

There may accordingly be formed, for each sequence, a set of sequence vectors that include:
the measured distance value,
the time information relating to the time-point of the measurement of the distance value, and
a rotational speed/velocity value, the so-called current rotational speed/velocity; if the rotor unit is accelerated and the rotational speed/velocity measurement is effected over a certain period of time, then the same associated current rotational speed/velocity values will usually also correspond in at least two sequence vectors.

According to the present invention, scaling is effected mathematically under the condition that, in the case of two measurements that follow one another in quick succession, the quadratic component of the equation of motion, i.e. expressing the angular component attributable to the acceleration, can be disregarded.

Such a linearization is possible if the time span between the measurement of two distance values is chosen so as to be just small enough. Accordingly, the current rotational speed/velocity is assigned to the first and second sequences, even if one of the measurements was effected later and the actual rotational speed/velocity value differs from the assigned, current value. Since the term that quadratically includes the time and that describes the acceleration is absent, a linear scaling, by means of the rotational speed, or velocity, is thus possible under the given mathematical conditions. The measurement may thus also be effected, for example, during the start-up phase of the machine. It is always necessary to wait the period of time required by the machine for starting-up, whether it be a short or a long period of time, since in this period of time the exact predefined requirements for the machining process (such as the rotational speed of the tool) have usually not yet been attained. Nevertheless, it is particularly advantageous if it can already be determined during the start-up of the rotor unit whether, for example, an axial runout error or a radial runout error or an angle error is present, because then the process can also be interrupted if necessary, and cleaning or repositioning of the tool can be performed before machining. In the case of a tool change, for example, it is usually to be expected that a change in the axial true-running, the radial true-running or the angular position will occur. If this deviation becomes so great that it exceeds a (possibly predefined) threshold, there is an error present.

Thus, the production time can also be increased, which is also directly associated with cost advantages. Particularly advantageously, the rotor unit is accelerated uniformly during the entire recording of measurement values. This again simplifies the evaluation, the approximation consisting merely in disregarding the acceleration portion from the path, or angle-time diagram. This is possible because the successively measured measurement values are recorded very shortly one after the other, and thus their time separation, or angular distance, is only small, i.e. the acceleration term, which is a quadratic function of time in the case of uniform acceleration, becomes correspondingly negligibly small.

Thus, in the case of an exemplary embodiment of the present invention, the scaling is performed with the acceleration being taken into account, by determination of current rotational speeds/velocities at different points in time and of the time interval between the rotational speed or velocity measurements. As a result of the acceleration term being disregarded, the path-time diagram, or angle-time diagram, comprises a linear term that is linearly dependent on time and in which the rotational speed/velocity (path velocity or angular velocity), not the acceleration, is included as a constant. The current rotational speed/velocity may be determined in various ways, depending on the embodiment of the invention. For example, it may be convenient to determine the current rotational speed, or velocity, on the basis of the marking, by measuring the time between two successive detections of the marking by the sensor/head. Such a manner of measurement is all the more accurate if the marking constitutes only a comparatively narrow portion in an angular segment, ideally a punctiform marking. Moreover, it is conceivable to realize the marking in such a way that it occupies a predefined arc portion, and the time is determined in which the marking, which extends over a known angular segment, passes the sensor head.

If, for example, a single marking is provided, i.e. the sensor/head is passed by the marking exactly once per revolution, a current rotational-speed measurement, or velocity measurement, is effected in that a current rotational speed/velocity is determined, as it were, with an inaccuracy of a rotational-speed/velocity change within one revolution. Differences due to acceleration within this time span of one revolution are then not taken into account. Conversely, the measurement is correspondingly more accurate if the marking constitutes only a fraction of the total angle of revolution 360° and it is determined, for example, when the front part of the marking in the direction of rotation enters the region of the sensor head, and the rear part of the marking in the direction of rotation subsequently passes the sensor head.

For example, the marking of one embodiment of the present invention may be realized as a groove, for instance in a measuring ring attached to the rotor unit specifically for this purpose, such that the regions outside the groove and inside the groove have different distance values. The flanks that occur at the edges of the groove are then measured, for example, and the distance values measured by the sensor head change accordingly. The groove may in principle have flanks that run perpendicularly or radially to the axis of rotation, or beveled flanks.

Accordingly, the progression can be tracked while the distance values are being measured by the sensor/head. Depending on the current angular velocity, or path velocity, the occurrence of the flanks can be observed at shorter or longer time intervals. In particular, in the case of a high rotational speed, an approximation that allows linearization may be effected in such a way that, for example, the measurement values of the first or second time-related and/or position-related sequence of measurement values are effected within one revolution of the rotor unit. In this case, it is assumed that the rotational speed, or velocity, remains constant within the revolution. Particularly in the case of high rotational speeds, such as occur with machine tools, this approximation is definitely subject to minor errors. In particular, higher angular velocities are to be expected at the end of the start-up phase, such that the measurement with the estimate made is more accurate in this range than at the beginning of the start-up phase.

Detection of the edges of a marking that covers a certain angular segment means that the marking is, in a sense, divided into sub-markings such that, for example, it can be ascertained by means of the sensor/head when the marking enters the region of the sensor head and leaves the region of the sensor head again. It is thus possible to measure, for example, when the marking in each case enters the region of the sensor head and the first flank is sensed by the sensor head. In each case, the time interval between two measurement events, in which the marking occurs and has the same distance value in each case, is. Similarly, time points may be used when the marking moves back out of the region of the sensor head. In this way, an error estimate can be made, because in this way, for each measuring point, i.e. for the two points at which there is the same distance value, a current rotational speed, or velocity, can be determined, but at the same time the time interval that lies between the two points can also be measured.

As already explained above, the respective rotational speeds/velocities can be determined, i.e. on the basis of a marking extending over a certain angular range or on the basis of the appearance of the same mark after one revolution. In this way it is estimated how the velocity changes with time, such that from this there is estimated an error that occurs in the approximation if, in the case of points that succeed one another in time, the acceleration term is negligible.

In this way, it is also advantageously possible to determine how accurately the method works and, if necessary, to adjust it accordingly. In the case of an advantageous form of application of the invention, time-related or position-related sequences of distance values may be used as a reference measurement. For example, it is conceivable to appropriately measure a new machine tool, a new tool holder, a new tool in which no chip may yet have been taken by a machining operation, and to record a first sequence of measurement values as a reference. It is also conceivable to run the rotor unit with a cleaned tool holder after a cleaning operating in order to produce a corresponding reference measurement. Any deviation from the reference measurement can thus be ascertained, and it is then evaluated whether the deviation is of such a magnitude that there is a radial runout error, a change in the axial true-running or an angle error, and thus a change in one of the individual cutting edges. In this way, the precision of the machining can be significantly improved. The measurement of the operating situation constitutes the comparison measurement, relative to the reference measurement.

A possible cutting state may also be inferred/sensed on the basis of this force signal. According to the present invention, tools could be replaced according to actual wear and not according to empirically based service life, which is usually indicated/specified by the manufacturer. This in turn saves costs in the tool stock, as well as maintenance work on the spindle etc. Tools can thus be used for longer, and spindles do not become overloaded by worn tools.

In the case of a sequence of distance values, the marking may, in particular, be set as an initial point, to enable the distance values to be assigned to each other different sequence, in particular, in difference formation and/or the Fourier transformation. To that extent, a reference measurement is advantageous because it can be determined by the measurement itself when a complete revolution has been effected. This is advantageous, in particular, when the method is executed without values relating to the instantaneous velocity, or rotational speed, being supplied to the evaluation electronics by other sensors, or by the machine control systems, but only the values of the sensor head, or sensor heads, effect this determination.

In principle, the distance profile per se can be captured in its entirely during one revolution. However, rotational speed is very high and, as a rule, measuring may also advantageously be effected with a comparatively high sampling rate. If, for example, there is an axial runout error or an angle error present as a result of a jammed chip and/or as a result of a somewhat worn/broken tool, or its cutting edges, a periodically occurring deviation will be ascertainable and assignable to the individual cutting edge. To enable this to be evaluated/processed, or realized, in an advantageous manner, it is useful, inter alia, to effect, for example, a Fourier transformation of the signal, which is performed as a discrete Fourier transformation, preferably as an FFT or DFT, in particular, to simplify the evaluation. For this purpose, the values of the first and the second sequence may be subtracted from each other, in which case the positions of the distance measurements must match for this purpose. However, such a difference formation may also be effected in such a manner after the Fourier transformation of the respective sequences. Ideally, all distance values would be identical, such that, in comparison with the reference measurement, there is no change in axial true-running, no impairment of the radial true-running or no change in angular position. However, due to static and systematic errors, in the measurement alone, it cannot be expected that the sensor/head always measures exactly the same distance values even without a change in axial true-running, without a changed angular position, or without radial runout errors.

If the distance values have irregularities, in particular singularities, these can be ascertained accordingly, as they are detected periodically, and thus a frequency can also be assigned to them, which is to be determined by the Fourier transformation. It is also conceivable for a mean value of the time-related, or position-related, sequence to be taken, with a difference subsequently being taken between mean values.

Depending on the type of error that is present (axial runout error with local displacement and/or deformation, or angle error with uniform change of distance), this can also result in recognition patterns which, if known, provide information about what type of error it is, for example whether there is a breakage and/or a chip is jammed, where it can be found, etc. For this purpose, for example methods of artificial intelligence, in particular, machine learning, may be used to enable the types of corresponding errors to be recognized and evaluated, be it an axial runout or an angle error. The use of neural networks is also possible in this respect. This measure advantageously makes it possible not only to recognize the occurrence of an error, but also to determine in more detail what the error actually consists of, such that it is ultimately possible to remedy it, for example by selectively replacing the damaged cutting edge, or so-called cutting insert. The downtimes of the machine can thus be significantly reduced. In the evaluation sequence, it is possible, for example, to search for corresponding changes in the measuring signal, i.e. for changed time-related or position-related distance values.

It must be taken into account, however, that every measurement is in principle also subject to errors. The more precise the measurements are and the higher the sampling rate at which the measurements are taken, the more it is also to be expected that, even in the case of a sufficient axial true-running, the same distance values will not always be measured over one revolution. It is therefore advantageous to be able to estimate tolerances. In particular, a threshold value may be defined, beyond which it is actually assumed that there is critical wear and/or a wedged chip, or another error contributing to a deviation from axial true-running or radial true-running, or resulting in an angle error that actually also has to be corrected. In this respect, such changes in the measurements may advantageously be compared in relation to a predetermined threshold value.

In the case of an exemplary embodiment of the present invention, difference values of the distances may be compared with a threshold value in the evaluation sequence, in particular, in the Fourier transform for a frequency value corresponding to the number of revolutions of the rotor per unit of time. In the event that the threshold value is exceeded, an axial runout/radial runout error, or angle error, is assumed because, for example, a breakage of a single cutting edge has resulted in a local displacement and/or deformation.

Moreover, in the case of an embodiment of the invention, a change in the rotor unit, or in the axis of rotation, can be determined from the difference of two of the time-related or position-related sequences. This displacement/deformation can have the effect, for example, that the tool comes into contact with the workpiece earlier or later than expected, or as provided for by the machine control systems. This can be recognized/sensed, and also influence the machining accuracy accordingly. Advantageously, recognition of a starting cut can be realized.

In principle, according to the present invention, not only the acting total force but also the individual cutting edge-force can be measured, for example, by means of an advantageous eddy-current sensor that can resolve/measure with such precision/speed.

In this way, a critical increase in the cutting-edge force can be recognized, and active intervention can be effected before the permissible maximum force of the cutting edge and/or of the tool is reached and the latter breaks. The active intervention may then be effected, for example, by retracting the tool and thereby relieving the cutting edge and, if necessary, simultaneously flushing a chip channel of the tool.

Despite preventative measures, tool breakage can occur again and again, for example if chips get wedged in the flute of a milling cutter or drill bit by pure chance. It has not hitherto been possible to predict tool breakage with process reliability even by conventional wear detection. In the case of deep-hole drilling, in particular, hitherto this has occurred even at a very advanced stage of the process, which in many cases results in rejects because, for example, the drill bit cannot be eroded out. Deep-hole drillings are usually drillings of a depth greater than seven times the diameter of drilled hole. The present invention now provides significant improvements, especially in the case of hitherto critical deep-hole drilling, but also to a considerable extent in ordinary drilling, or milling work, or the like, where a very early and/or prompt recognition of correspondingly critical states/situations of the machining process, or of the tool and of the individual cutting edge/cutting edges, can be realized.

BRIEF DESCRIPTION OF THE DRAWINGS

An exemplary embodiment of the present invention is represented in the drawing, and explained in greater detail in the following on the basis of the figures.

DETAILED DESCRIPTION OF THE INVENTION

Figure 1:
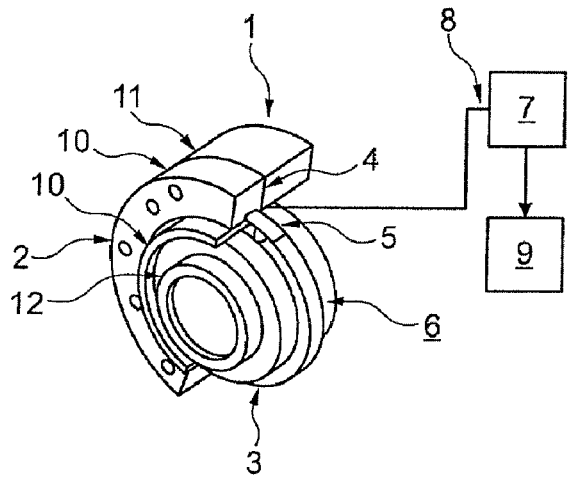
FIG. 1 a schematic representation of a first machine-tool unit according to the present invention.

FIG. 1 shows a schematic representation of a machine-tool unit 1 that has a stator unit 2 and a rotor unit 3, it being the case in FIG. 1, in particular, that a spindle head is to be regarded as part of the rotor unit 3. The stator unit 2 has a ring 4 to which a sensor head, in the form of an axial sensor 5, is attached. The rotor unit 3 comprises a measuring ring 6 made of a metal, which here is advantageously made of a paramagnetic material. The axial sensor 5 is arranged so as to measure a distance to an end-face surface of the rotor unit 3. However, a lateral measurement, radial to the axis of rotation, is also conceivable. This surface to which the distance is determined is located on the measuring ring 6.

The axial sensor 5 is realized as an eddy-current sensor in order that the most accurate measurements possible can be obtained despite any fouling.

The sensor head/axial sensor 5 is connected to an electronics unit 7; both together form a checking device 8, which in turn is connected to a machine control system 9 such that, if necessary, intervention in the control system can be effected in the event of excessive axial runout errors.

In the case of a particularly preferred further development, only one sensor head 5 is provided. It is conceivable to additionally use a trigger sensor, e.g. for recognizing an optical reference marking on the measuring ring 6, in which case such a trigger sensor may also be attached, for example, to the sensor ring 4. The marking may also be realized as a groove or the like. With such a trigger sensor, only the initial point for the measurements is triggered, so that, in the evaluation, the phase relationships of the measurement values to each other can be more easily defined. A trigger sensor is not absolutely necessary, and is also not represented further in FIG. 1.

The stator unit 2 comprises an enclosure 10 for the sensor ring 4, and also a bearing cover 11. There is a tool clamping device 12 attached to the rotor unit 3 (FIG. 1 shows the taper ring).

A sequence 20 of reference measurement values is first acquired in each case with the new machine-tool unit 1, using the available tools 50 (cf., for example, FIGS. 10A and 10B), which are clamped into a tool holder. This may be done in the factory or at the customer's site. A reference measurement can also be effected with a tool 50 or tool holders; however, this is not necessary as a matter of course, but in certain circumstances it increases the precision of the measurement and may possibly facilitate the detection of even small changes to/with a cutting edge 53 of the tool 50, especially if, for example, individual tools 50 or tool holders are to be used. During operation, a new sequence 21 of distance values is then subsequently determined for the same tool 50, or tool holder.

For example, the following procedure may be used to detect cutting-edge changes or loads:

1. start-up of the spindle to nominal rotational speed,
1.a. use of a general reference as described above, and/or from/by means of an electronic/electrical memory, and/or
1.b. recording of a reference, in the time domain, that is only temporarily stored for as long as the machining process is running, and then comparison of this process/operation against this reference, and/or
1.c (only) a reference FFT (see below) is formed, which in some cases is sufficient to identify changes in the spectrum, e.g. chatter,
2.a. evaluation is then effected on individual revolutions in order to recognize cutting-edge changes with greater precision, and/or to realize a visualization, or display, and/or
2.b. recording is effected at fixed intervals, i.e. evaluation (always) over a fixed interval, e.g. every 10 ms, and/or
2.c the evaluation is realized by means of AI.
3.a the result is visualized, and/or
3.b operation is modified, such as modifying/adjusting the feed rate, and/or
3.c control of the operation, or process.

Figure 2:
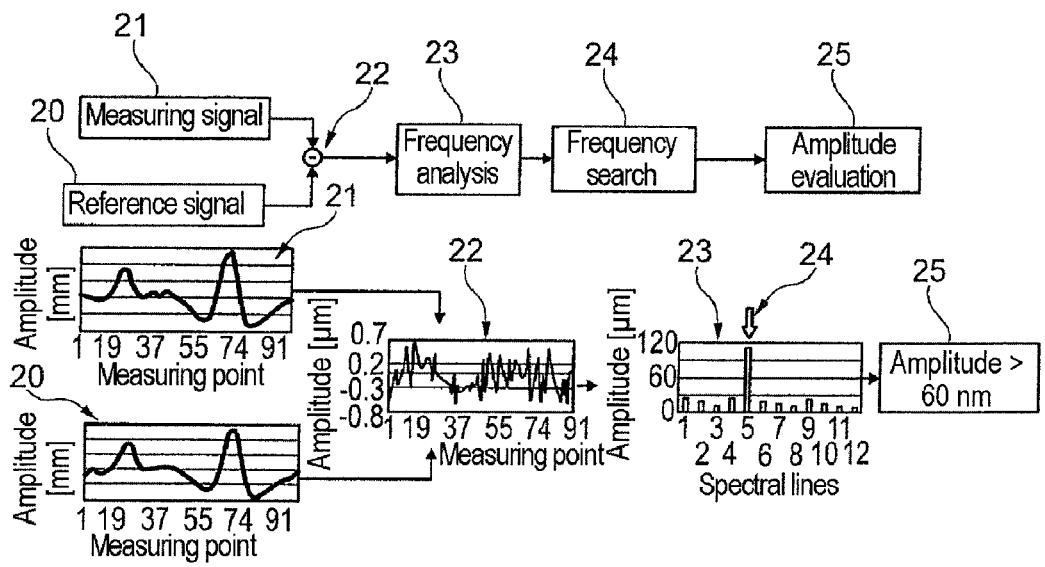
FIG. 2 a schematic representation of a part of the checking method according to the present invention for checking the clamping state.

A set of reference measurements may thus be performed for different tools 50 or tool holders; this operation increases the recognition accuracy. Since the sequences 20, 21 are preferably already recorded upon the start-up of the machine unit 1, and thus during an acceleration of the rotor unit 3, the position data of the respective distance values must be scaled to enable them to be compared with each other. In FIG. 2, the values are accordingly already scaled for the sequences 20, 21. In FIG. 2, the difference 22 is formed. Subsequently, a frequency analysis 23 of the signal is effected, in the form of a Fourier transformation. It is checked (method step 24) whether there is a deviation at a certain frequency, e.g. at the rotation frequency of the rotor unit 3, or at which frequencies such changes occur. If these exceed a critical and/or predefined/stored threshold value K (cf., for example, FIG. 11), there is a disturbance variable, or disturbance, present, e.g. a critical wear of a cutting edge 53, a breakage of a cutting edge 53 or a deformation due to a wedged chip in the region of a cutting edge 53 (amplitude evaluation: method step 25).

Figure 3:
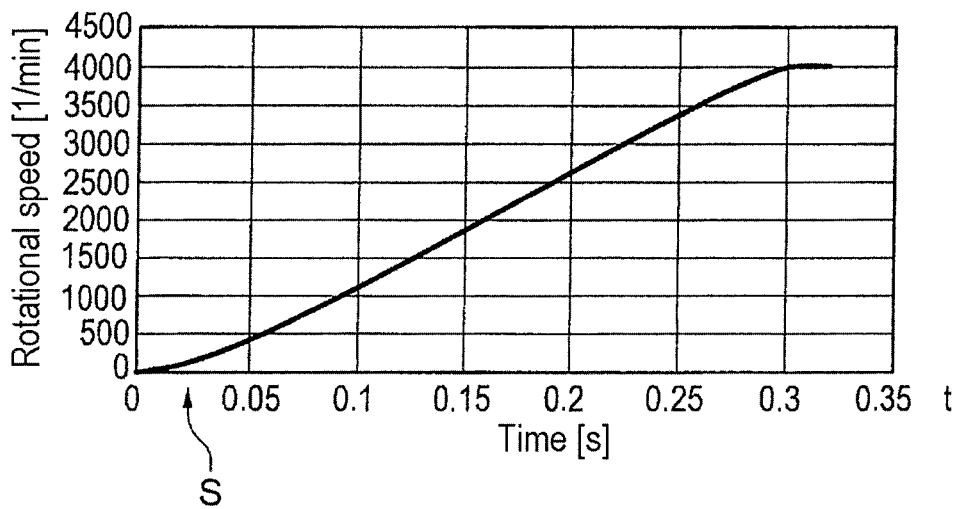
FIG. 3 a diagram of the relationship between rotational speed and time, to illustrate the start-up of the rotor unit.

In series operation, the reference measurement may be performed at very short time intervals, in particular, after a tool change, possibly once during the first start-up phase, and the individual-cutting-edge check according to the present invention may preferably be performed during each/the entire machining phase. In FIG. 3, as an example, the rotor unit 3 is accelerated in the first 300 ms, during which a measurement value is already being taken. The rotational speed of the rotor unit 3 is represented as a function of the time progression t. The S-curve S shows a curve that is curved slightly to the left, i.e. a slow start-up in order to avoid jerky movements of the rotor unit. Linearization is not useful in this range because the acceleration is not constant and an approximation by disregarding the acceleration component is generally too inaccurate. Substantially, however, there is otherwise a constant acceleration, i.e. a linear dependence of the speed on the time t. If no axial runout can be detected here, machining can be performed, i.e. a tool 50 and tool holder are correctly clamped/fitted. Otherwise, braking may be necessary for safety reasons. From approximately 300 ms onwards, a constant speed of approximately 4000 revolutions per minute is attained for the machining example.

Figure 4:
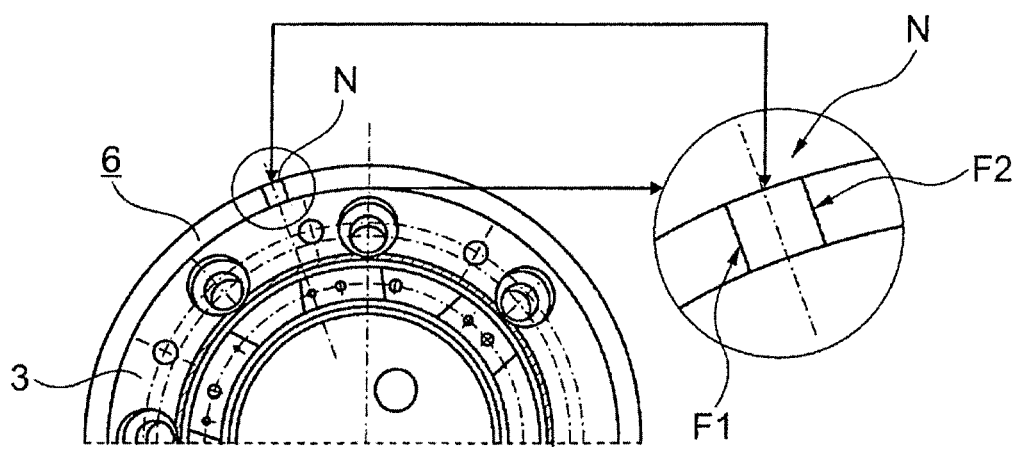
FIG. 4 a radially arranged groove applied to the measuring ring.

FIG. 4 shoes a section through a rotor unit 3 comprising a measuring ring 6 that has a groove N in the side region. The enlarged representation shows the edge regions F1, F2, which may be realized as flanks and which can be sensed at a correspondingly high sampling rate. Thus, for example, a current rotational speed/velocity can also be determined by when the sensor head senses the corresponding flanks at the beginning and end of the groove N. Since the angular range over which the groove N extends is known, the angular distance between these two flanks is also known, such that only the time interval between the occurrence of the flanks has to be determined.

Figure 5:
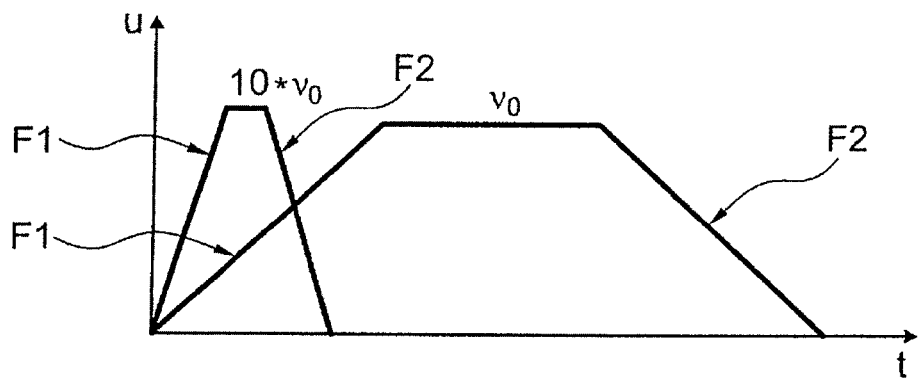
FIG. 5 a distance-time diagram in the detection of a groove.

FIG. 5 shows two illustrations showing the profile of the measured distance u between the sensor head 5 and the rotor unit 3 when the groove N passes the sensor head 5 at different speeds in each case, here once at 10 times the rotational speed/velocity. In the region of the flanks F1, F2, the dependence of the distance u on time is ramp-shaped, since the groove N also shows a ramp-shaped progression in the region of F1, F2. The profile is therefore compressed in time at a higher rotational speed/speed 10 $v_0$.

Figure 6:
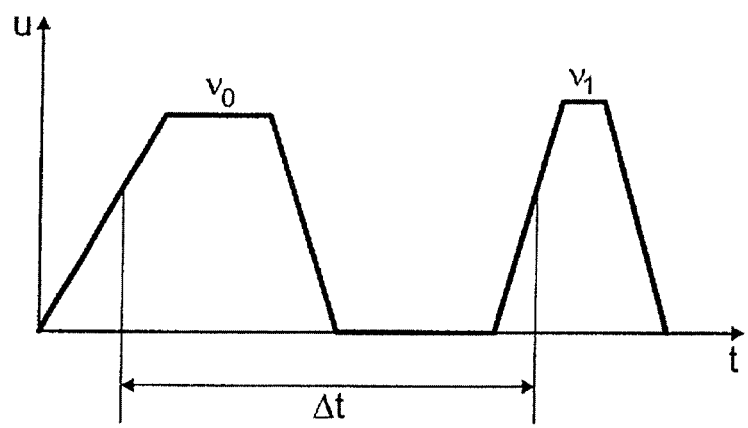
FIG. 6 an illustration of an error estimation on the basis of the distance-time diagram.

FIG. 6, in turn, shows how an error in the linearization (disregarding the acceleration term) can be estimated in the case of short time intervals.

The same groove N is measured in direct time succession with respect to its distance u. Since there is uniform acceleration, the later measurement of the groove N, which is effected, for instance, at the rotational speed/velocity v1, is compressed compared to the previous one, i.e. v1>v0. There is one revolution between the two measurement events. In the linearization, it is assumed that the same rotational speed/velocity is present between both measurement events. The time interval between the two measurement events is the time between two points of the same flank F1 (or F2 respectively) at which the distance is the same. The maximum error can thus be estimated:

$$\Delta v / \Delta t = (v_1 - v_0) / \Delta t.$$

Figure 7:
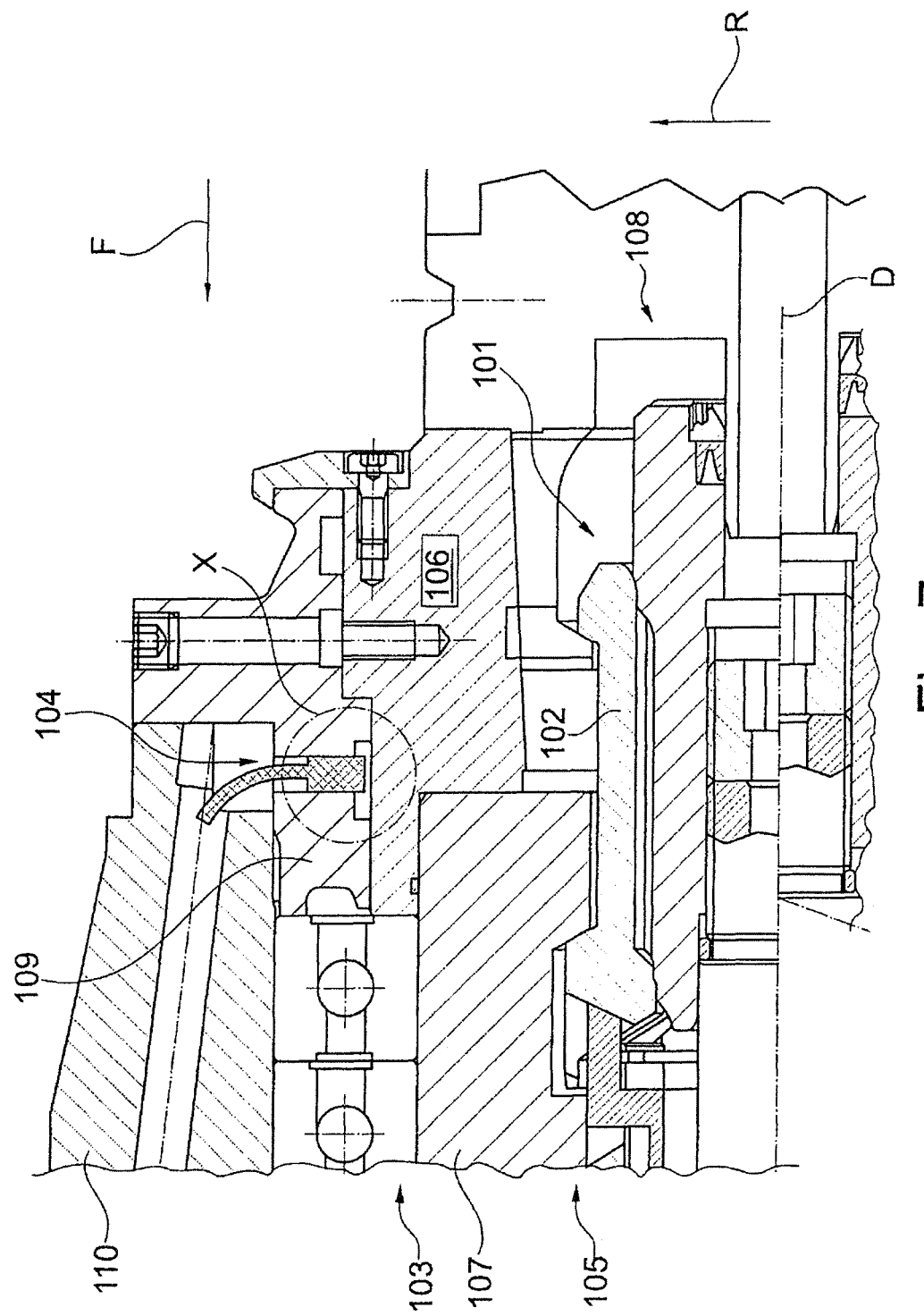
FIG. 7 a schematic sectional detail of a motor spindle according to the present invention, with a radial sensor.
Figure 8:
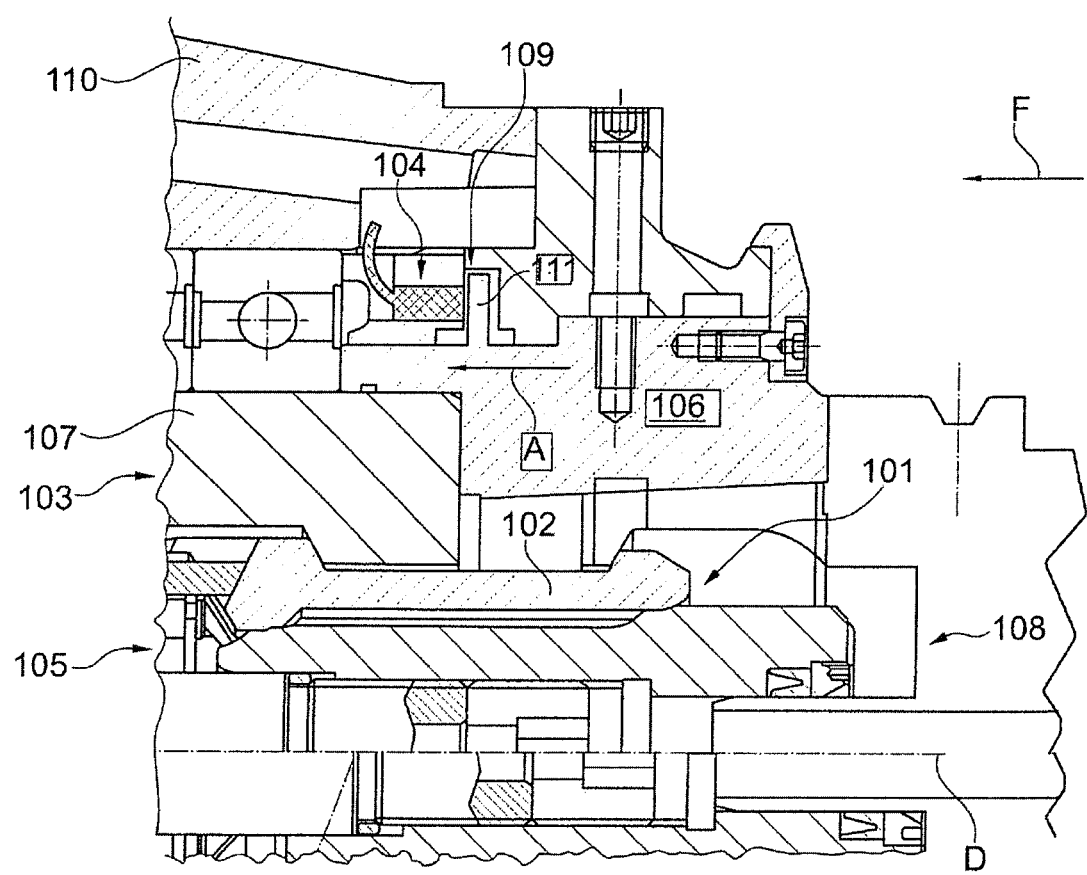
FIG. 8 a schematic sectional detail of a further motor spindle according to the present invention, with an axial sensor.

FIGS. 7 and 8 show two further advantageous variants of the present invention, in which a motor spindle 3 of a machine tool is represented in section. As is usual in machine tool construction, one side of a collet chuck 1 having a plurality of clamping segments 2 is represented in the unclamped state (part almost not represented) and in the clamped state of the motor spindle 3, or collet chuck 1.

In the represented, clamped part of the motor spindle 3 of FIGS. 7 and 8, an individual-cutting-edge sensor 4 according to the present invention can be seen. In FIG. 7 this sensor 4 has a radially aligned effective range, and in FIG. 8 it has an effective range aligned in the axis of rotation D. Accordingly, a radial sensor 4 in the sense of the present invention is represented in FIG. 7, and an axial sensor 4 in the sense of the invention is represented in FIG. 8. Not visible in FIGS. 7 and 8, however, is an optionally usable second sensor 4 according to the present invention, since this, if used, would be/is arranged offset in the circumferential direction, in particular, by 90° or 180°, etc., and is thus not visible in the sectional representations. The arrangement with two sensors 4 according to the present invention is/would be visible in cross-section, e.g. in FIG. 9.

Changes in the cutting edges 53 of the tool 50, which is not represented in greater detail here in FIGS. 7 and 8, or resulting from a load, or application of force, to the tool 50, or to the cutting edges 53, that is directed axially and/or radially in relation to the axis of rotation D, a region X of a spindle shaft 5, or of a counter-holder 6, or stop/ring element 6, of the motor spindle 3, which is represented schematically in FIG. 7, becomes deformed, or widened, in the radial direction R. In this case an element 7 of the spindle shaft 5 transmits a clamping force F, or displacement and/or deformation, i.e. alteration, to the element 6. As a result, a distance 9, or air gap 9, between the rotor unit, or spindle shaft 5, and a stator unit 10 comprising the radial sensor 4 is altered, or reduced.

The state according to the above-mentioned reference measurement in the region X is the specified state within the meaning of the present invention, and an alteration, caused by force/changes in the cutting edges 53, of the sensed actual displacement and/or deformation, or the actual state, is accordingly used in an advantageous manner for monitoring/controlling the motor spindle 3, i.e. preferably for monitoring, or checking, of individual cutting edges.

In FIG. 8, an axially aligned deformation of a measuring arm 11 comprising the axial sensor 4, or an axial change A in the distance 9, can be sensed and processed further. This axial change A is in turn by a force/change F on the cutting edges 53, or axial and/or radial deformation/alteration on the cutting edges 53 of the tool 50, which is transmitted to the tool receiving unit 8 and to the element 6.

Figure 9:
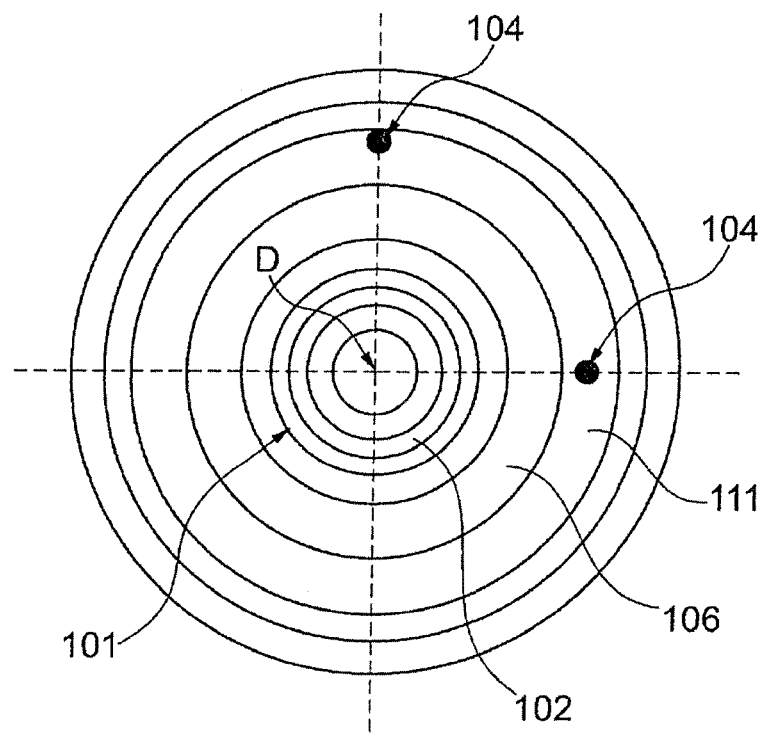
FIG. 9 a schematic cross-section, in the direction of the axis of rotation of the motor spindle according to FIG. 8, with two axial sensors according to the present invention.

Represented in highly schematic form in FIG. 9 is a cross-section through the variant according to FIG. 8, illustrating the optional arrangement of two sensors 4. These two sensors 4, as well as two radially oriented sensors 4 according to FIG. 7, which are not represented in greater detail, are preferably arranged offset by 90° or 180° in the circumferential direction. Symmetrical or asymmetrical displacements and/or deformations/alterations of the counter-holder 6, or stop/ring element 6, of the motor spindle 3 and/or of the tool receiving unit 8, caused by the load on the individual cutting edges, can be sensed by the two sensors 4 and analyzed/evaluated in an advantageous manner.

Figures 10A, 10B:
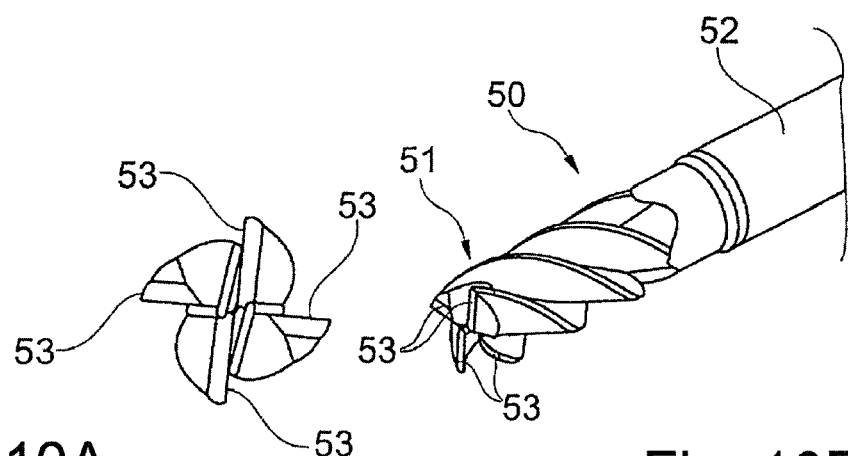
FIGS. 10A and 10B show a milling tool to be monitored, having four cutting edges, schematically in a top view and a perspective view.

Represented schematically in FIGS. 10A and 10B is a commercially available tool 50, or milling cutter 50. It has a tool head 51 that in this case, as an example, has four individual cutting edges 53, and a tool shank 52. The tool shank 52 is usually held in a tool holder, which is not represented in greater detail, and inserted into the tool receiver.

Figure 12:
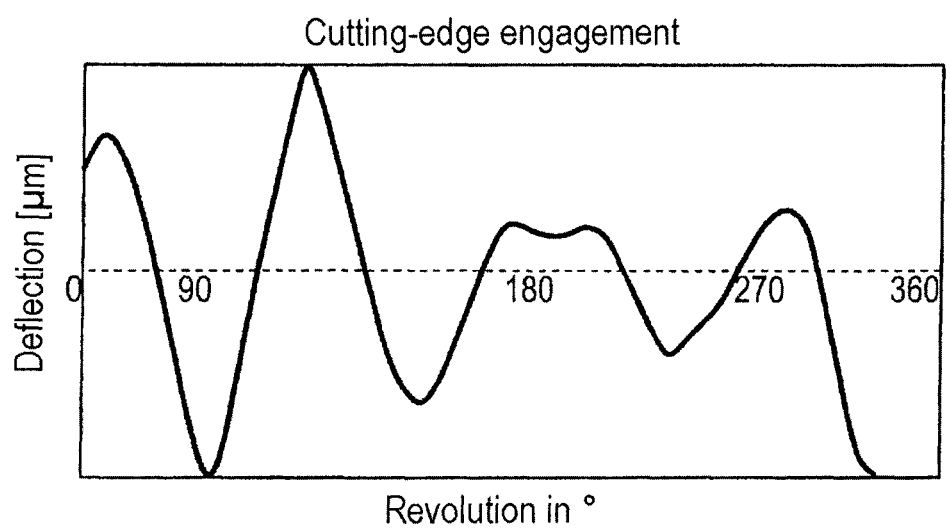
FIG. 12 a schematic axial deflection of a tool having four cutting edges, during one revolution of a drilling process.

FIG. 12 shows an example of an axial deflection of a tool 50 having four cutting edges 53, such as the milling cutter 50 shown in FIGS. 10A and 10B, during one revolution of a drilling process. Shown clearly here are four peaks of the deflection caused by the four cutting edges 53. One peak in this case is slightly flattened, which indicates a somewhat impaired cutting edge 53, or a certain amount of wear.

Figure 11:
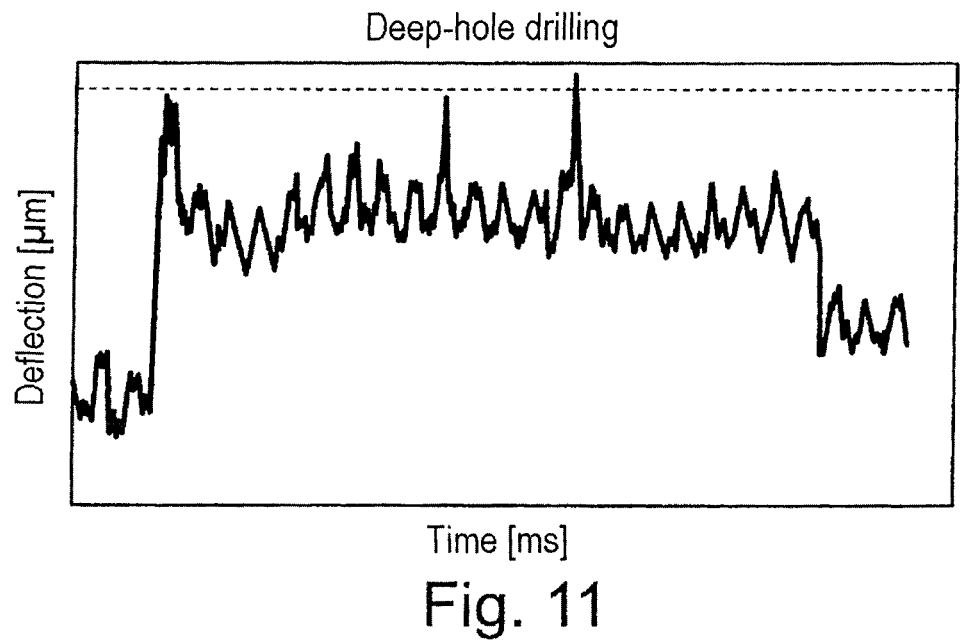
FIG. 11 a machining process of a groove, in schematic form, in which jamming of the chips has been caused by excessive feed motion.

Shown as an example for illustrative purposes in FIG. 11 is a process of machining a groove, in which a jamming of the chips has been caused by excessive feed motion. This can be seen in the middle region, at the two very high peaks. As an example, in FIG. 11 a predefined/critical threshold value K is drawn in the diagram, which has been exceeded by the second, particularly high peak. This is to illustrate that, for example, a stored threshold value K may be predefined as a specified-state/value and which, when exceeded as represented by an example in FIG. 11, can result in a machine reaction and/or in advantageous signaling, or output of a display/alarm. In this way, for example, a disadvantageous jamming of possibly excessively large chips at the machining point, or at one of the cutting edges 53, may result in an immediate stop and/or alarm, such that a breakage of the tool 50 or one of the cutting edges 53, or an inaccurate machining of the workpiece, can be prevented in an effective manner.

LIST OF REFERENCES 1 machine-tool unit
2 stator unit
3 rotor unit
4 sensor ring
5 axial sensor
6 measuring ring
7 electronics unit
8 checking device
9 machine control system
10 enclosure
11 bearing cover
12 taper ring/tool clamping device
20 reference signal
21 measuring signal
22 difference operator
23 frequency analysis
24 frequency search
25 amplitude evaluation
50 tool
51 tool head
52 tool shank
53 cutting edge
101 collet chuck
102 collet-chuck element
103 motor spindle
104 sensor
105 spindle shaft
106 stop
107 element
108 tool receiving unit
109 distance
110 stator unit
111 measuring arm
A change
a acceleration
D axis of rotation
F force
F1, F2 flanks at groove edges
K threshold value
N groove
R direction
t time
u distance
$v_0$ rotational speed/velocity
X region
$\Delta\varphi$ phase difference

The invention claimed is:

1. A motor-driven machine-tool unit, having a stator unit and a rotor unit that is rotatable at least about an axis of rotation, the rotor unit comprising at least one tool receiving unit for receiving a tool, the tool receiving unit comprising a tool clamping device, which is adjustable in a longitudinal direction of the axis of rotation and to which a clamping force can be applied, for fixing and clamping a releasably fixable tool shank of the tool, a tool head of the tool comprising at least one individual cutting edge, there being at least one tool sensor provided for sensing a load on the tool, wherein the tool sensor is an individual-cutting-edge sensor for sensing a cutting-edge load on the individual cutting edge, and wherein the stator unit comprises at least the individual-cutting-edge sensor; and
wherein the individual-cutting-edge sensor is an individual-cutting-edge force sensor for sensing an application of force to the individual cutting edge.

2. The motor-driven machine-tool unit according to claim 1, wherein the individual-cutting-edge sensor, as viewed in an axial direction, is arranged at least partially at a level of the tool clamping device and/or of the tool receiving unit.

3. The motor-driven machine-tool unit according to claim 1, wherein the individual-cutting-edge sensor is a contactlessly operating sensor for contactless sensing of the cutting-edge load on the individual cutting edge.

4. The motor-driven machine-tool unit according to claim 1, wherein the individual-cutting-edge sensor is a proximity sensor for sensing a distance between the stator unit and/or the proximity sensor and at least a part of the rotor unit and/or of the tool receiving unit, the distance being such that it can be altered by the cutting-edge load on the individual cutting edge.

5. The motor-driven machine-tool unit according to claim 1, wherein the individual-cutting-edge sensor is an axial sensor having at least one sensing region aligned in a longitudinal direction of the axis of rotation.

6. The motor-driven machine-tool unit according to claim 1, wherein the rotor unit and/or the tool receiving unit comprise/comprises at least one marking.

7. A machine tool, comprising a tool and a motor-driven machine-tool unit according to claim 1.

8. A method for sensing a cutting-edge load on a single cutting edge of a tool, there being used a tool head of the tool that has at least one individual cutting edge, the tool and/or a tool holder for holding the tool detachably fixed to a tool clamping device of a tool receiving unit of a rotor unit, being received by a motor-driven machine-tool unit,
wherein in clamping of the tool, the tool clamping device is adjusted in a longitudinal direction of the axis of rotation and/or arranged in a spindle head and/or the tool receiving unit of the rotor unit, the motor-driven machine-tool unit having a stator unit relative to which the rotor unit is mounted so as to be rotatable about an axis of rotation, at least one tool sensor is used to sense a load on the tool, the tool sensor being an individual-cutting-edge sensor for sensing a cutting-edge load of the individual cutting edge, wherein the method comprises the following steps:

arranging the individual-cutting-edge sensor on the stator unit, providing at least one sensor head of the individual-cutting-edge sensor for a purpose of determining a distance between the stator unit and/or the sensor head and at least a part of the rotor unit and/or of the tool receiving unit/spindle head, the distance being altered by the cutting-edge load on the individual cutting edge, measuring the distance from a part of the rotor unit and/or of the tool receiving unit/spindle head, recording at least one time-related and/or position-related sequence of distance values measured by means of the individual-cutting-edge sensor and/or sensor head, and determining an axial runout and/or a radial runout and/or an angular change and/or a torsional moment exclusively taking into account the time-related and/or position-related sequence of measured distance values to the part of the rotor unit/tool receiving unit/spindle head rotating relative to the individual-cutting-edge sensor and/or sensor head.

9. The method for sensing the cutting-edge load according to claim 8, wherein a marking is provided on the rotor unit and/or tool receiving unit/spindle head, the individual-cutting-edge sensor and/or sensor head senses the marking on the rotor unit during measurement, the current rotational speed/velocity of the rotor unit is sensed on the basis of the sensing of the marking by the individual-cutting-edge sensor and/or sensor head.

10. The method for sensing the cutting-edge load according to claim 9, wherein the current rotational speed/velocity of the rotor unit is determined on the basis of the marking in that:

there is provided as a marking one such that marks a specific angular segment of the rotor unit during rotation, and the time required by the sensor head for the marking, in the case of a known angular segment, to pass the individual-cutting-edge sensor and/or sensor head is determined, and/or the time between two successive detections of the marking by the individual-cutting-edge sensor and/or sensor head is measured.

11. The method for sensing the cutting-edge load according to claim 8, wherein a groove is used as a marking, such that the region outside the groove and inside the groove have different distance values.

12. The method for sensing the cutting-edge load according to claim 8, wherein a time-related and/or position-related sequence of distance values, which is used as a reference measurement, is recorded before a first machining operation by the motor-driven machine-tool unit and/or after a cleaning operation, collectively or individually for each tool used.

13. The method for sensing the cutting-edge load according to claim 8, wherein the marking is used as the initial point, and the initial point for the evaluation is assigned to the sequences of distance values in order to enable the distance values of different sequences to be assigned to one another.

14. The method for sensing the cutting-edge load according to claim 8, wherein an evaluation sequence of values is determined by means of at least one of the following calculations:

a difference formation between two of the time-related sequences, and subsequently a Fourier transformation of the previously formed difference of the first and second time-related and/or positional sequence and/or a Fourier transformation of the sequences in each case, and subsequently a difference formation between the respectively Fourier-transformed time-related sequences and/or formation of the mean value of the time-related and/or position-related sequences with subsequent formation of the difference between the mean values.

15. The method for sensing the cutting-edge load according to claim 8, wherein the evaluation sequence is searched for a deviation or at least two deviations that exceed a predefined threshold value and, in the event of the threshold value being exceeded, a change in wear of a cutting edge and/or a breakage of a cutting edge and/or jamming of a cutting edge/clamping is assumed.

16. The method for sensing the cutting-edge load according to claim 14, wherein in the Fourier transform in the case of a frequency value corresponding to the number of revolutions per unit of time of the rotor unit, the difference value of the distances is compared with a threshold value and, in the event of the threshold value being exceeded, a change in wear of a cutting edge and/or a breakage of a cutting edge breakage and/or jamming of a cutting edge/clamping is assumed.

17. The method for sensing the cutting-edge load according to claim 16, wherein the determination of whether a change in wear of a cutting-edge and/or a breakage of a cutting-edge and/or jamming of a cutting-edge/clamping is/are present is performed by applying artificial intelligence.

18. The motor-driven machine tool unit according to claim 1, wherein the machine tool unit is a multi-axis rotary head or a motor spindle.

19. The motor-driven machine tool unit according to claim 1, wherein the tool comprises two, three or four cutting edges.

* * * * *